(12) United States Patent
Dong et al.

(10) Patent No.: US 7,986,524 B2
(45) Date of Patent: Jul. 26, 2011

(54) COVER RELEASING ASSEMBLY AND ELECTRONIC DEVICE USING THE SAME

(75) Inventors: Shui-Jin Dong, Shenzhen (CN); Yu Zhang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/633,085

(22) Filed: Dec. 8, 2009

(65) Prior Publication Data

US 2010/0327712 A1 Dec. 30, 2010

(51) Int. Cl.
*H05K 5/00* (2006.01)
*H05K 7/00* (2006.01)
*H04M 1/00* (2006.01)
*A47B 81/00* (2006.01)

(52) U.S. Cl. ......... 361/679.55; 361/679.56; 361/679.57; 361/679.58; 361/679.59; 361/679.27; 455/575.1; 455/575.3; 455/575.4; 455/575.8; 312/223.1; 312/223.2; 312/223.3

(58) Field of Classification Search ............. 361/679.01, 361/679.02, 679.08, 679.09, 679.3, 679.55–679.59, 361/679.21; 345/156, 157, 168, 169, 184; 455/325, 556.1, 550.1, 90.1, 575.1, 575.3, 455/575.4, 575.8; 70/357, 367, 406, 381, 491; 174/535; 29/557; 312/223.1, 223.2, 223.3

See application file for complete search history.

(56) References Cited

U.S. PATENT DOCUMENTS

| 7,436,656 B2 * | 10/2008 | Jiang et al. ............... 361/679.55 |
| 7,495,898 B2 * | 2/2009 | Lo et al. ................... 361/679.55 |
| 7,513,541 B1 * | 4/2009 | Gregory .......................... 292/48 |
| 2004/0192418 A1 * | 9/2004 | Nam .......................... 455/575.1 |
| 2007/0026888 A1 * | 2/2007 | Zhou .......................... 455/550.1 |
| 2009/0303668 A1 * | 12/2009 | Zhao et al. ............... 361/679.01 |

\* cited by examiner

*Primary Examiner* — Jayprakash N Gandhi
*Assistant Examiner* — Jerry Wu
(74) *Attorney, Agent, or Firm* — Steven M. Reiss

(57) ABSTRACT

A electronic device includes a housing, a cover detachably mounted on the housing and a releasing assembly. The housing has a first surface and two latching hooks disposed on the first surface. The releasing assembly is mounted on the cover to assemble the cover to the housing and detach the cover from the housing. The releasing assembly includes a fixing base mounted on the cover, two latching pieces, an elastic piece and a releasing piece. The two latching pieces are slidably mounted on the fixing base and both includes a latching end exposing out of the fixing base. The elastic piece is elastically assembled to the fixing base to connect the two latching pieces together. The releasing piece is releasably assembled to the fixing base for releasably resisting on the two latching pieces to make the latching pieces release from the corresponding latching hooks.

12 Claims, 4 Drawing Sheets

COVER RELEASING ASSEMBLY AND ELECTRONIC DEVICE USING THE SAME

TECHNICAL FIELD

The exemplary disclosure generally relates to releasing assemblies, and particularly, to a cover releasing assembly and electronic device using the cover releasing assembly.

DESCRIPTION OF RELATED ART

Batteries are widely used in electronic devices, such as personal digital assistants (PDAs), mobile phones, etc. Conventional batteries are detachably received in the electronic device to ensure the batteries and inner circuits of the electronic devices are protected.

A conventional electronic device generally includes a cover tightly engagable with a housing. However, due to the tight engagement of the cover and the housing in many conventional designs, a significant amount friction exists between the cover and the housing. As a result, the user may need to apply a significant amount of strength to assemble/disassemble the cover to/from the housing. Further, the cover and the housing may be distorted or even damaged during the assembly/disassembly operations.

Therefore, there is room for improvement within the art.

BRIEF DESCRIPTION OF THE DRAWINGS

Many aspects of the cover releasing assembly and electronic device using the same can be better understood with reference to the following drawings. These drawings are not necessarily drawn to scale, the emphasis instead being placed upon clearly illustrating the principles of the present cover releasing assembly and electronic device. Moreover, in the drawings like reference numerals designate corresponding sections throughout the several views.

DETAILED DESCRIPTION

Figure 1:
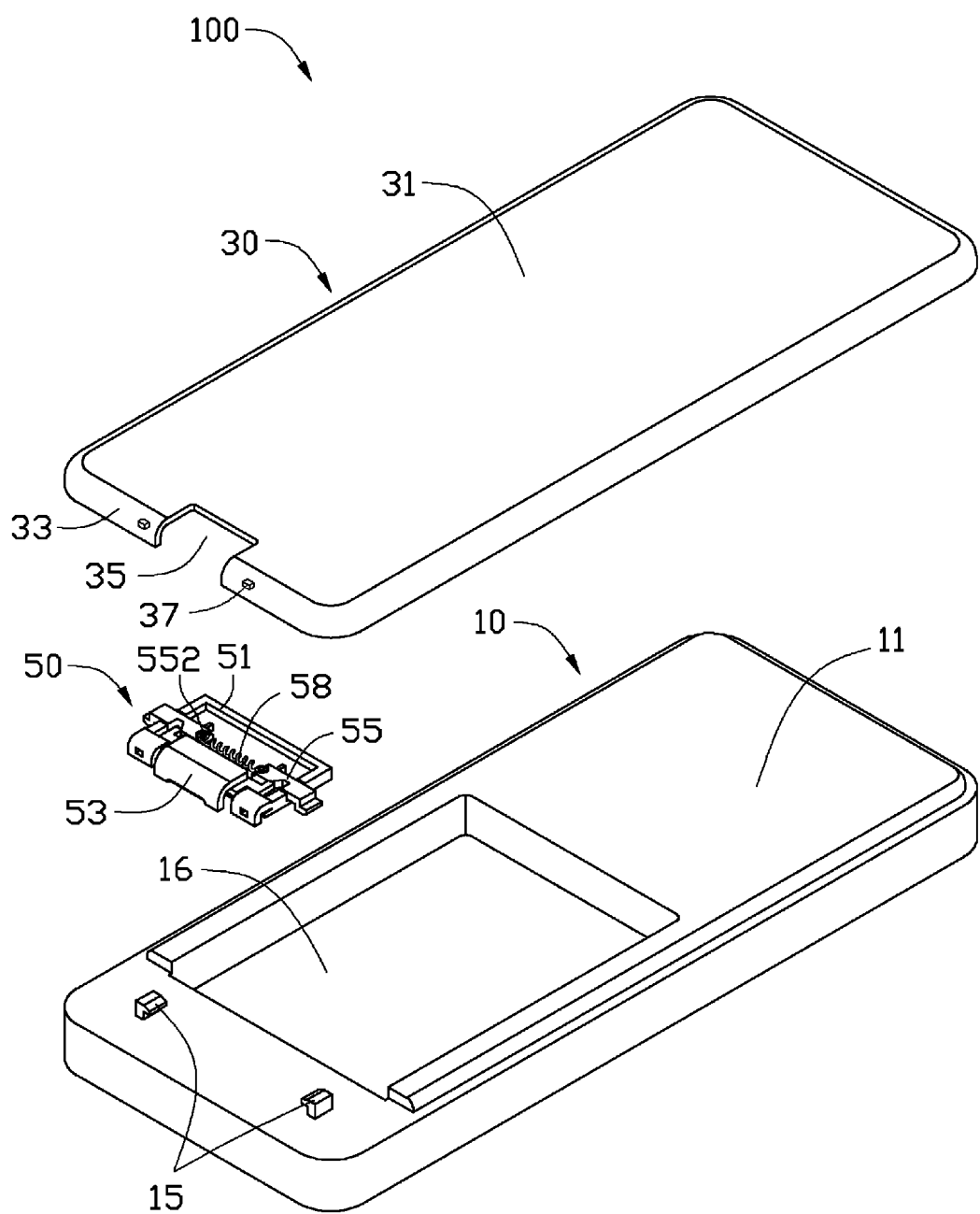
FIG. 1 shows an exploded, perspective view of an electronic device with a cover releasing assembly applied thereto, in accordance with an exemplary embodiment.

Referring to FIG. 1, an exemplary exploded, perspective view of an electronic device 100 such as mobile phone, digital camera, etc., having a cover releasing assembly 50 is shown. The electronic device 100 includes a housing 10, a cover 30, and a cover releasing assembly 50. The releasing assembly 50 is mounted on the cover 30 to detachably assemble the cover 30 to the housing 10.

The housing 10 may be a main body of the electronic device 100. The housing 10 includes a first surface 11, two latching hooks 15, and a recessed battery receiving compartment 16. The two latching hooks 15 are disposed on the first surface 11 of the housing 10 adjacent to one end thereof for detachably latching to the releasing assembly 50.

The cover 30 is detachably mounted on the first surface 11 of the housing 10 to cover the receiving compartment 16. The cover 30 includes a top wall 31 and a peripheral wall 33 extending substantially perpendicularly from the peripheral edge of the top wall 31. The cover 30 has a rectangular notch 35 defined at one end thereof for assembling the releasing assembly 50. The peripheral wall 33 includes two spaced latching blocks 37 disposed thereon and positioned adjacent at two sides of the notch 35 respectively to assemble the releasing assembly 50 to the cover 30.

Figure 2:
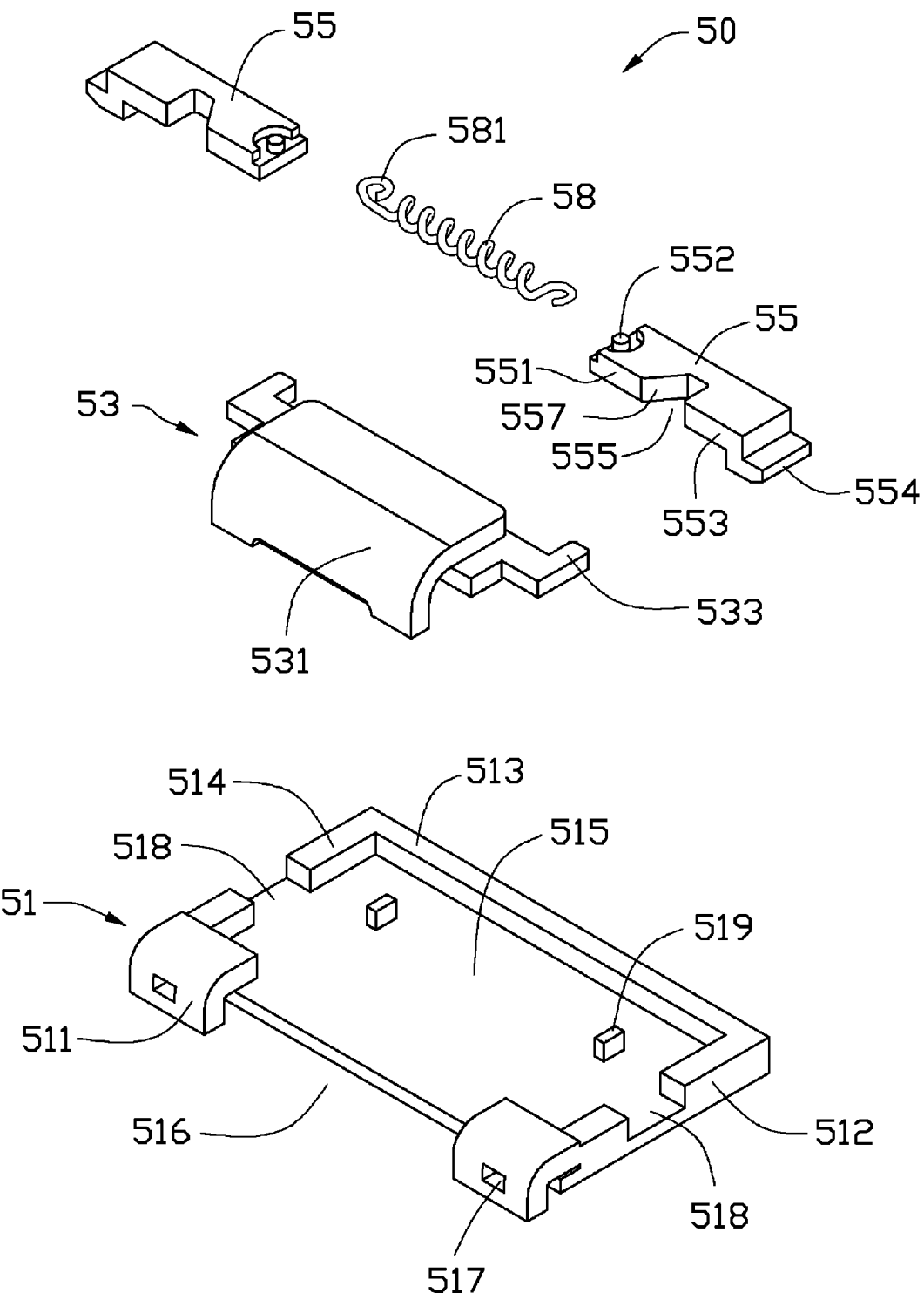
FIG. 2 shows an exploded, perspective view of the cover releasing assembly of FIG. 1.

Referring to FIG. 2, the releasing assembly 50 is mounted on the cover 30 and partially accommodated within the notch 35 of the cover 30. The releasing assembly 50 includes a fixing base 51, a releasing piece 53, two latching pieces 55, and an elastic piece 58. The fixing base 51 is configured to be mounted on an inner side surface of the cover 30 corresponding to the notch 35. The fixing base 51 and the notch 35 of the cover 30 cooperatively form an assembling space (not labeled) used for assembling and accommodating the releasing piece 53, the two latching pieces 55, and the elastic piece 58 therein. In the exemplary embodiment, the fixing base 51 defines a recess 515 therein to assemble the elastic piece 58 and the releasing piece 53. The recess 515 includes a bottom wall (not labeled), a first sidewall 511, two opposite and parallel second sidewalls 512, 514, and a third sidewall 513 parallel to the first sidewall 511. The bottom wall includes two spaced-apart protruding posts 519. The first sidewall 511 is arcuate and defines a gap 516 in a substantially middle portion thereof communicating with the recess 515. Each of two sides of the first sidewall 511 adjacent to the gap 516 define a latching hole 517 therethrough corresponding to the two latching blocks 37 of the cover 30 respectively to assemble the fixing base 51 to the cover 30. The two opposite second sidewalls 512, 514 each defines an opening 518 therethrough in a substantially middle portion thereof communicating with the recess 515 respectively.

The releasing piece 53 is a button slidably/releasably assembled with the cover 30 and accommodated within the assembling space. The cover 30 can be locked to or released from the housing 10 by operating the releasing piece 53. The releasing piece 53 includes a pressing key 531 and two pushing arms 533 respectively disposed at opposite ends of the pressing key 531. The pressing key 531 is substantially arcuate. The two pushing arms 533 are substantially L-shaped, and protrude outwardly from two opposite sides of the pressing key 531.

The two latching pieces 55 are slidably mounted on two sides of the fixing base 51 for releasably latching to the corresponding two latching hooks 15 of the housing 10. The latching piece 55 includes a connecting end 551 and an opposite latching end 553. The connecting end 551 includes a fixing post 552 protruding therefrom for assembling the elastic piece 58. The latching end 553 includes a substantially L-shaped latching arm 554 extending from a distal end thereof, corresponding to the latching hook 15 of the housing 10. A substantially V-shaped sloping channel 555 is recessed from a middle portion of the latching piece 55 corresponding to the pushing arm 533 of the releasing piece 53 and thereby forming a sloping wall 557 therein.

The elastic piece 58 is a compression spring elastically assembled between the two latching pieces 55 in the exemplary embodiment. The elastic piece 58 includes a substantially ring-shaped fixing portion 581 formed at each end thereof corresponding to the fixing post 552 of the connecting end 551 of the latching piece 55.

Figure 3:
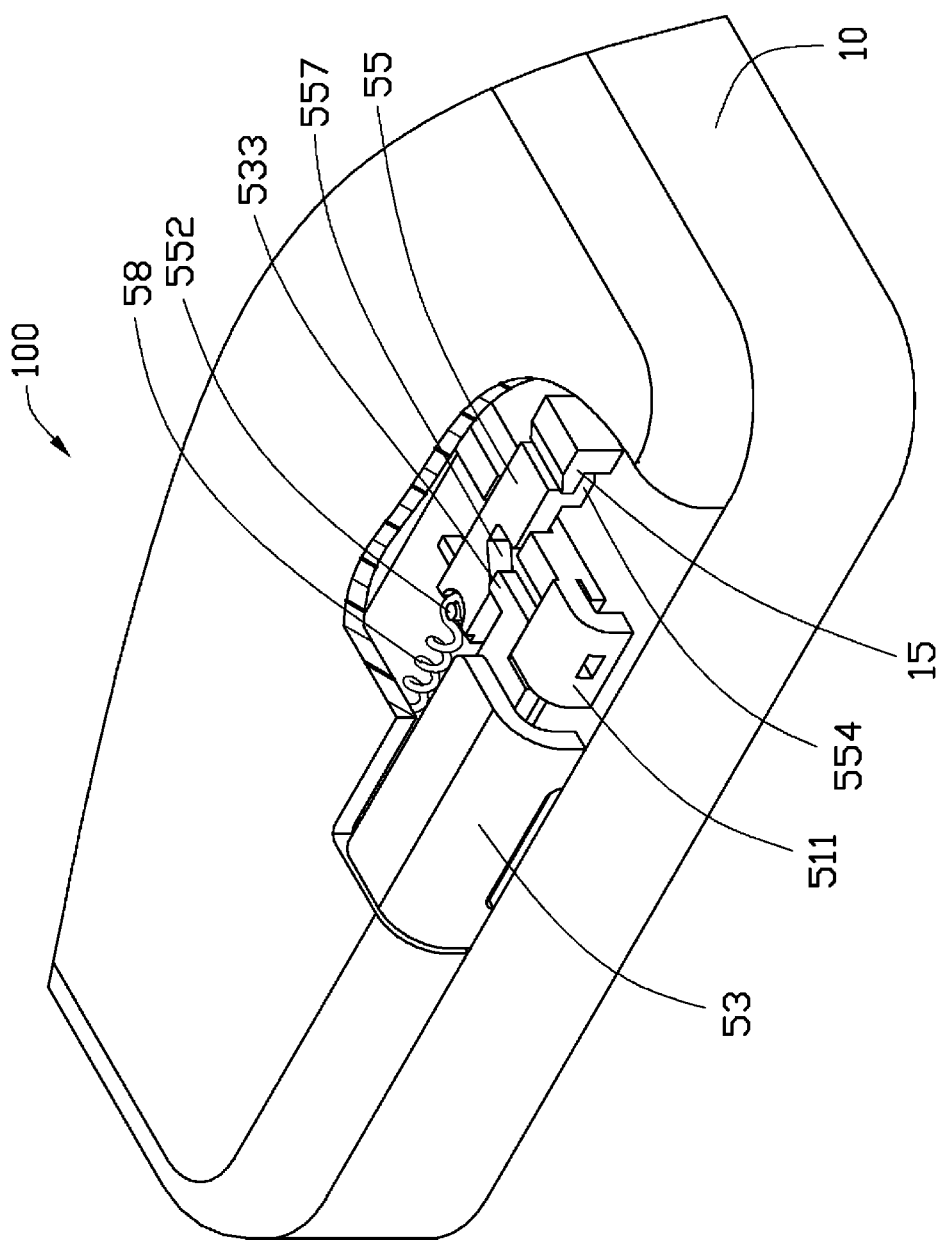
FIG. 3 shows a partial enlarged perspective view of the electronic device, wherein, the cover releasing assembly is assembled thereto.

Also referring to FIG. 3, to assemble the releasing assembly 50, the releasing piece 53 is slidably assembled within the recess 515 of the fixing base 51, and the pressing key 531 is accommodated within the corresponding gap 516 of the fixing base 51. The two latching pieces 55 are assembled within the recess 515 of the fixing base 51, and the latching ends 553 thereof penetrate through the corresponding openings 518 and extend respectively out of the two second sidewalls 512 and 514 of the fixing base 51. The connecting ends 551 of the two latching pieces 55 resist/abut on the respective corresponding posts 519 of the fixing base 51. The two pushing arms 533 of the releasing piece 53 latch into the corresponding sloping channels 555 and tightly resist on the corresponding sloping walls 557 of the two latching pieces 55. The elastic piece 58 is assembled within the recess 515 of the fixing base 51, the two fixing portions 581 are respectively fixed to the fixing posts 552 of the connecting ends 551 of the two latching pieces 55.

To assemble the electronic device 100, the assembled releasing assembly 50 is fixedly assembled to the cover 30. The two latching blocks 37 of the battery 30 are respectively latched into the corresponding two latching holes 517 of the fixing base 51. The pressing key 531 is releasably accommodated within the corresponding notch 35 of the cover 30. The assembled cover 30 is mounted on the first surface 11 of housing 10; the pressing key 531 is pushed to urge the two pushing arms 533 slide into the corresponding sloping channels 555 of the two latching pieces 55. The two latching pieces 55 are pushed to move/slide toward each other to compress the releasing piece 58 to align the two latching arms 554 of the two latching pieces 55 with the corresponding two latching hooks 15 of the housing 10. Then, the pressing key 531 is released allowing the two latching arms 554 of the two latching pieces 55 to latch into the corresponding two latching hooks 15, thus, the cover 30 is assembled to the housing 10.

Figure 4:
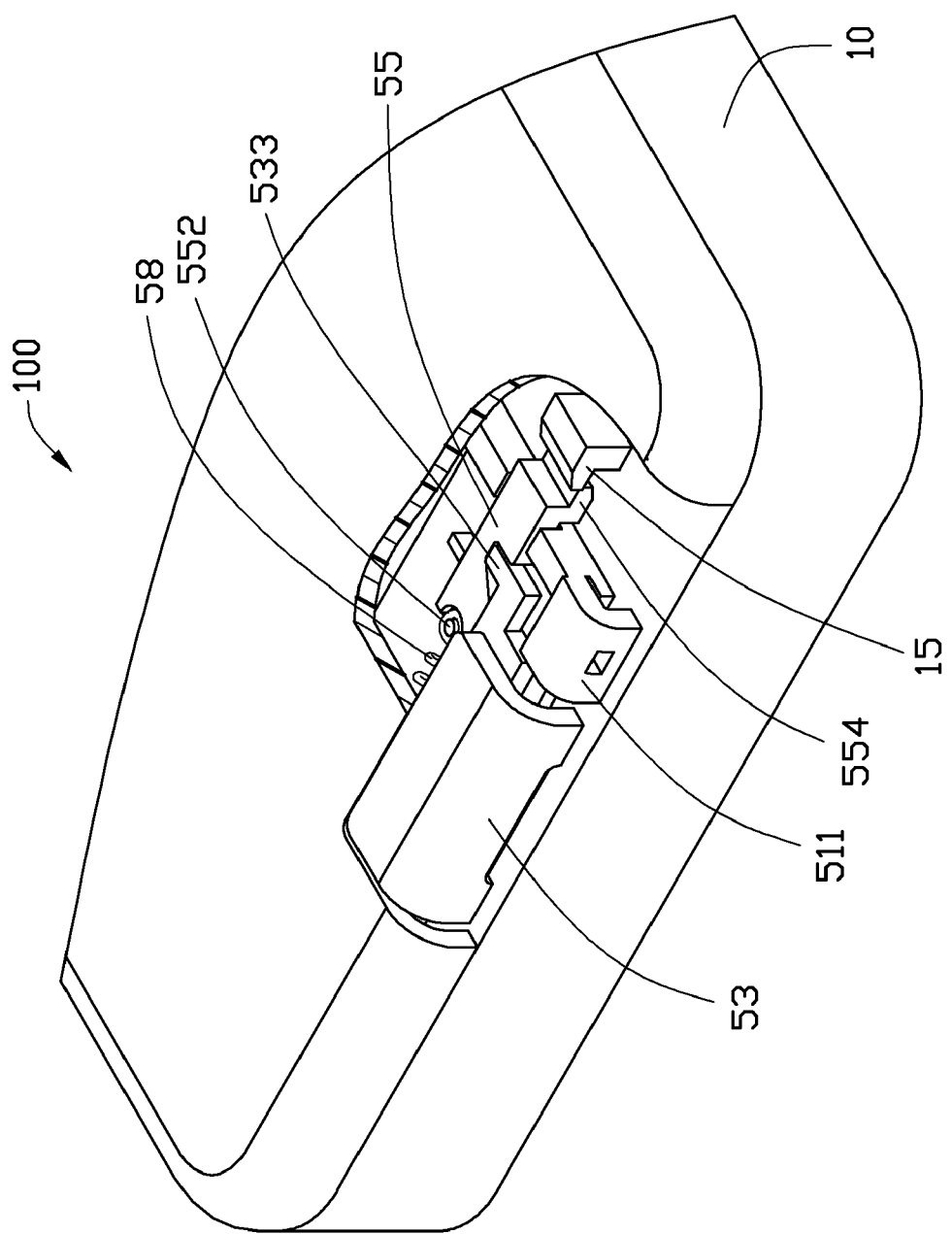
FIG. 4 is similar to FIG. 3, with the cover releasing assembly released to detach the cover from the housing.

Referring to FIG. 4, to detach the cover 30 from the housing 10, the pressing key 531 is pushed to detach the latching arms 554 of the two latching pieces 55 from corresponding two latching hooks 15, then, the cover 30 can be detached from the housing 10.

It is to be understood, however, that even through numerous characteristics and advantages have been set forth in the foregoing description of embodiments, together with details of the structure and functions of the embodiments, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A releasing assembly used in an electronic device comprising:
   a fixing base defining a recess therein, the recess comprising a bottom wall;
   two latching pieces slidably mounted on the fixing base and each comprising a latching end exposing out of the fixing base; and
   an elastic piece elastically assembled to the fixing base to connect the two latching pieces together; and
   a releasing piece releasably assembled to the fixing base, the releasing piece comprising a pressing key and two pushing arms are respectively disposed at two sides of the pressing key, the two pushing arms respectively slidably resisting on the corresponding two latching pieces;
   wherein the elastic piece, the two latching pieces and the releasing piece are assembled within the recess, and the bottom wall comprises two posts spaced protruding therefrom.

2. The releasing assembly as claimed in claim 1, wherein the recess further includes a first sidewall, two opposite second sidewalls, a third sidewall parallel to the first sidewall, the two opposite second sidewalls each defines an opening therethrough respectively communicating with the recess respectively; the latching ends of two latching pieces penetrate through their respective openings and expose out of the two second sidewalls of the fixing base.

3. The releasing assembly as claimed in claim 2, wherein the two posts are parallel to the first sidewall and accommodated within the recess; the latching piece further includes an opposite connecting end resists on the corresponding post of the fixing base.

4. The releasing assembly as claimed in claim 3, wherein the first sidewall defines a gap therethrough communicating with the recess; the pressing key is accommodated within the corresponding gap of the fixing base.

5. The releasing assembly as claimed in claim 4, wherein the two sides of the first sidewall adjacent to the gap both define a latching hole therethrough.

6. The releasing assembly as claimed in claim 3, wherein the latching piece further includes a fixing post protruding from the connecting end thereof for assembling the elastic piece; the elastic piece includes a substantially ring-shaped fixing portion formed at each end thereof configured for connecting to the corresponding fixing post of the connecting end of the latching piece.

7. The releasing assembly as claimed in claim 3, wherein the latching piece further includes a substantially V-shaped sloping channel recessed therefrom corresponding to the pushing arm of the releasing piece.

8. An electronic device, comprising:
   a housing having a first surface and two latching hooks disposed on the first surface;
   a cover detachably mounted on the housing, the cover defining a notch therethrough;
   a releasing assembly mounted on the cover to assemble the cover to the housing and detach the cover from the housing, the releasing assembly comprising:
      a fixing base mounted on the cover, the fixing base defining a recess therein, the fixing base combining with the cover to form an assembling space, the recess comprising a bottom wall, a first sidewall, two opposite second sidewalls, a third sidewall parallel to the first sidewall, the two opposite second sidewalls each defining an opening therethrough respectively communicating with the recess, the bottom wall comprising two posts spaced protruding therefrom parallel to the first sidewall and accommodated within the recess;
      two latching pieces slidably mounted on the fixing base and both comprising a latching end and an opposite connecting end, the latching end penetrating through their respective openings and exposing out of the two second sidewalls of the fixing base respectively for detachably latching with the corresponding latching hook of the housing, the connecting end resisting on the corresponding post of the fixing base;
      an elastic piece elastically assembled to the fixing base to connect the two latching pieces together; and
      a releasing piece releasably assembled to the fixing base, the releasing piece comprising a pressing key and two pushing arms respectively disposed at opposite sides of the pressing key, the two pushing arms respectively slidably resist on the corresponding two latching pieces to make the latching pieces release from the corresponding latching hooks;
   wherein the elastic piece, the two latching pieces and the releasing piece are assembled within the recess and accommodated within the assembling space.

9. The electronic device as claimed in claim 8, wherein the first sidewall defines a gap therethrough communicating with the recess; the pressing key is accommodated within the corresponding gap of the fixing base.

10. The electronic device as claimed in claim 9, wherein the two sides of the first sidewall adjacent to the gap both define a latching hole therethrough; the cover includes two spaced latching blocks disposed thereon and positioned adjacent to the two sides of the notch respectively for latching with the corresponding two latching holes of the fixing base.

11. The electronic device as claimed in claim 8, wherein the latching piece further includes a fixing post protruding from the connecting end thereof for assembling the elastic piece; the elastic piece includes a substantially ring-shaped fixing portion formed at each end thereof configured for connecting to the corresponding fixing post of the connecting end of the latching piece.

12. The electronic device as claimed in claim 8, wherein the latching piece further includes a substantially V-shaped sloping channel recessed therefrom corresponding to the pushing arm of the releasing piece.

* * * * *